United States Patent [19]

Twerdochlib

[11] Patent Number: 4,922,233

[45] Date of Patent: May 1, 1990

[54] FLOW SENSOR AND SYSTEM INCORPORATING THE SAME FOR MONITORING STEAM TURBINE DRAIN VALVES

[75] Inventor: Michael Twerdochlib, Oviedo, Fla.

[73] Assignee: Westinghouse Electric Corp., Pittsburgh, Pa.

[21] Appl. No.: 190,323

[22] Filed: May 5, 1988

[51] Int. Cl.⁵ .............................................. G08B 21/00
[52] U.S. Cl. .................................. 340/606; 340/608; 73/204.25
[58] Field of Search ............... 340/606, 607, 608, 622; 73/204.11, 204.19, 295, 204.25

[56] References Cited

U.S. PATENT DOCUMENTS

| | | | |
|---|---|---|---|
| 3,438,254 | 4/1969 | Seeley | 340/606 |
| 4,418,035 | 11/1983 | Smith | 376/247 |
| 4,439,396 | 3/1984 | Rolstad | 374/10 X |
| 4,440,717 | 4/1984 | Bevilaqua et al. | 73/295 X |
| 4,449,403 | 5/1984 | McQueen | 73/295 |
| 4,576,050 | 3/1986 | Lambert | 73/204.18 X |

OTHER PUBLICATIONS

Brochure of Fluid Components, Inc. entitled, "Liquid Level & Interface Controllers", printed April, 1985.

Primary Examiner—Joseph A. Orsino
Assistant Examiner—Jeffery A. Hofsass
Attorney, Agent, or Firm—D. C. Abeles

[57] ABSTRACT

A flow sensor includes a strap-on heater attached to a fluid conduit downstream of a drain valve and two differential temperature measuring thermocouples attached to the fluid conduit downstream of the heater. A monitoring system employing at least one of the flow sensors further includes a controller which receives the differential temperature signal produced by the two thermocouples, a signal indicative of a selected valve position, and a signal indicative of steam turbine operating condition, i.e., hot or cold. The controller includes a logic circuit for correlating the differential temperature value signal, the valve position signal and the steam turbine condition signal to a diagnosis of the drain valve condition.

17 Claims, 4 Drawing Sheets

| TURBINE (S5) | VALVE (S4) | ΔT (S1) | DRAIN VALVE DIAGNOSIS | NO. 1 |
|---|---|---|---|---|
| O Hot | O Open | O Low | O Valve Functional | |
| O Hot | O Open | O High | O Clogged Or Stuck Shut | |
| O Hot | O Closed | O Low | O Stuck Open | |
| O Hot | O Closed | O High | O Valve Functional | |
| O Cold | O Open | O Low | O Cold Fluid Thru Valve | |
| O Cold | O Open | O High | O Valve Functional | |
| O Cold | O Closed | O Low | O Valve and/or Monitor Malfunction | |
| O Cold | O Closed | O High | O Valve Functional | |

| Valve (S4') | S5 | ΔT-SI" | ΔT-SI | Diagnosis | NO. 1 |
|---|---|---|---|---|---|
| Open | Hot | High | High | O Clogged Valve | |
| Open | Cold | High | High | O Functional | |
| Open | N/A | High | Low | O Monitor Malfunction | |
| Open | N/A | Low | High | O Monitor Malfunction | |
| Open | High | Low | Low | O Functional | |
| Open | Cold | Low | Low | O Cold Fluid Flow | |
| Closed | N/A | High | High | O Functional | |
| Closed | N/A | High | Low | O Monitor Malfunction | |
| Closed | N/A | Low | High | O Monitor Malfunction | |
| Closed | N/A | Low | Low | O Valve Stuck Open | |

FLOW SENSOR AND SYSTEM INCORPORATING THE SAME FOR MONITORING STEAM TURBINE DRAIN VALVES

BACKGROUND OF THE INVENTION

1. Field of the Invention

This invention relates to sensors for monitoring fluid flow and more particularly, to a flow sensor and to a monitoring system incorporating the same for monitoring the condition of steam turbine drain valves.

2. Description of the Relevant Art

In a steam turbine power generating system, drain valves are placed in the steam turbine casings, steam turbine piping and auxiliary piping to prevent water induction incidents. Water forms as a normal consequence of bringing a large turbine to load, and can also collect during turning gear and synchronous operation due to improper piping design and system malfunction. Water induction is a problem that poses a threat to the operation and safe maintenance of steam turbine generators. The likelihood of experiencing a water induction incident increases and becomes more critical as the turbines age and when they are used for cyclic and/or for shift operation. Malfunctions of the equipment in the heat cycle can cause such induction to occur at various locations.

A problem associated with drain valves is that they sometimes become plugged and block fluid flow, even when open. Another problem is that drain valves sometimes may stick and thus remain in a closed position when conditions demand that they should be in an open position, or visa versa. Thus, a need exists for a sensor which can detect the presence or absence of fluid flow through a drain valve.

Flow sensors are generally known and used to determine the presence or absence of fluid flow. U.S. Pat. No. 3,366,942—Deane, illustrates a differential temperature sensor, used as a flow stoppage detector. The sensor, or probe, comprises a pair of heat sensing probes with a heater probe thermally connected therewith. The sensing and heater probes are adapted for being introduced into a conduit through which a fluid may flow. The heater probe is spaced more closely to one than to the other of the sensing probes. In the absence of flow, the sensing probe closer to the heater probe is at a higher temperature than the other sensing probe; conversely, when a fluid flows past the probes, heat is conducted away from the heater probe and thus the temperature difference between the two sensing probes decreases, or disappears.

U.S. Pat. No. 3,898,638—Deane et al., i r such differential temperature sensor, having the same basic configuration as that of the earlier Deane U.S. Pat. No. 3,366,942 but represented to have an improved internal structure of the temperature sensing probes which affords increased accuracy of measurements. As noted therein, differential heating of the two temperature sensing probes by the heater probe may be accomplished in part by, for example, the heat shunt running between the heater probe and the more adjacent of the two temperature sensing probes; further, both convection and/or conduction in the medium at rest, and conduction in the shunt, serve to carry heat differentially between the probes.

Monitoring systems presently used to monitor the condition of a drain valve and employing differential temperature sensors are ineffective or insufficient for a number of reasons. One system, shown in FIG. 1, employs two temperature sensing thermocouples 2 and 4 to passively detect a clogged condition of drain valve 1. This is accomplished by placing thermocouple 2 upstream of the drain valve 1 and thermocouple 4 downstream of the drain valve 1 and in thermal contact with pipe 3. The drain valve 1 is determined to be open and thus permitting hot fluid from the turbine to flow therethrough if both thermocouples 2 and 4 read substantially the same temperature. Conversely, the drain valve 1 is determined to be closed if the thermocouple 2 reads high and thermocouple 4 reads low. Determination of open or closed status is made by controller 5 which compares temperature signals supplied via lines 2' and 4' from thermocouples 2 and 4, respectively. Open or closed status is then compared to selected valve position as indicated at the control station via line 1'. Another known monitoring system, illustrated in FIG. 2, employs a similar temperature differential sensing technique in which two thermocouples 6 and 8 are placed downstream of the drain valve 7 with thermocouple 6 in thermal contact with the pipe 3' and thermocouple 8 being somewhat thermally isolated from the pipe 3' to provide a reference temperature. Determination of open or closed status is made by controller 9 which compares temperature signals supplied via lines 6' and 8' from thermocouples 6 and 8, respectively. Open or closed status is then compared to a selected valve position as indicated at the control station via line 7'.

Figure 1:
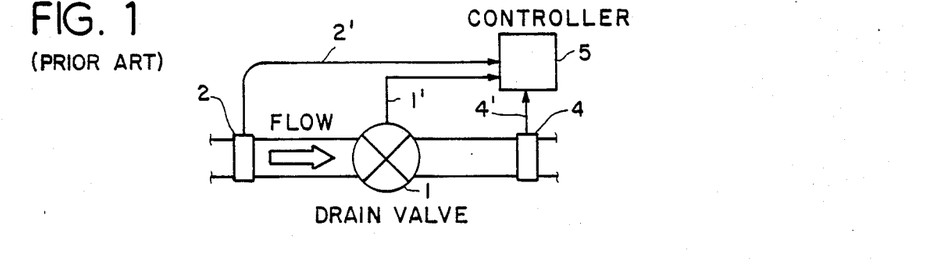
FIG. 1 is a schematic representation or one form of known flow sensor.
Figure 2:
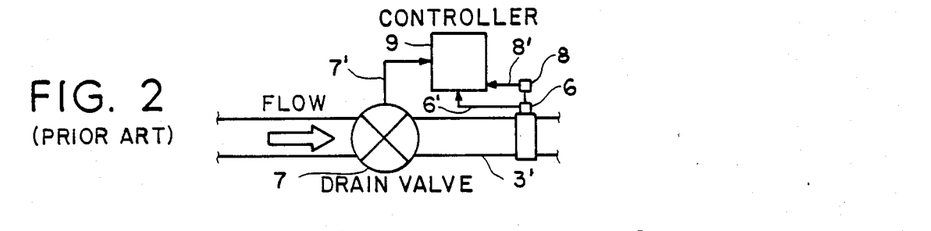
FIG. 2 is a schematic representation of another known flow sensor.

The monitoring systems of FIGS. 1 and 2 are both inadequate for a number, of reasons. For instance, long thermal reaction times are required following the change of state of a drain valve. During these periods, which may take up to 45 minutes, the monitoring systems must be turned off or disabled to prevent false alarms. Another problem is that both systems rely on hot fluid from the turbine and cannot function when the turbine is cold. Therefore, during a cold state of operation, the monitoring system must be turned off to prevent false alarms. Another important problem is that the systems of FIGS. 1 and 2 cannot identify the reverse flow of cold water through the drain valve during a cold start-up.

Yet another problem with the known monitors is that they are easily confused when interconnected drains are used which allow steam from one drain to reach the sensor of another drain which is valved closed. When this occurs, the closed drain valve will be diagnosed as being stuck open. Such false indications need to be avoided.

Currently available sensors and monitoring systems incorporating the same using differential temperature to detect fluid flow have failed to satisfy critical needs in the industry. Accordingly, there remains a critical need for improved sensors and monitoring systems for reliably and rapidly detecting malfunctions of drain valves in steam turbine installations, thereby to permit corrective actions for avoiding the potentially serious water induction incidents which otherwise may result.

SUMMARY OF THE INVENTION

An object of the invention is to prevent water induction incidents in steam turbines.

Another object of the invention is to sense the condition a drain valve to indicate whether or not fluid is flowing through the drain valve.

Another object of the invention is to monitor the condition of drain valves provided in steam turbine casings, steam turbine piping, and auxiliary piping to determine if the drain valves are in a proper state.

Another object of the invention is to monitor several drain valves simultaneously and indicate the operating condition of each.

Another object of the invention is to monitor one or more drain valves in order to provide accurate valve condition data with a fast response time.

The flow sensor of the present invention detects flow through a drain valve disposed in a fluid conduit and comprises a heater attached to an exterior surface of the fluid conduit downstream of the drain valve, a first temperature sensing element attached to the exterior surface of the fluid conduit downstream of the heater, a second temperature sensing element attached to the exterior surface of the fluid conduit downstream of the first temperature sensing element, and means for producing a differential temperature value based on a difference between the temperature sensed by the first temperature sensing element and the temperature sensed by the second temperature sensing element. The differential temperature value is produced by electrically interconnecting first and second thermocouples in reverse series, whereby the electrical output of one is subtracted from that of the other. The differential temperature value indicates a state of fluid flow based on a comparison of the differential temperature value produced by the thermocouples to a predetermined differential temperature trigger value. The trigger value is derived from the fact that the heater produces a thermal gradient along the fluid conduit which results from conductive heat transfer. Heat flows along the pipe from the region of higher temperature at the point of heater attachment to a region of lower temperature away from the heater. The change in temperature value per unit of distance in a specific direction can be plotted as the thermal gradient curve. Without fluid flow, the temperature sensed by the first temperature sensing element is high relative to the second temperature sensing element. This in turn leads to a relatively high differential temperature and a relatively steep slope for the thermal gradient curve. With fluid flow, the temperature sensed by the first temperature sensing element is lowered due to conductive heat transfer from the fluid conduit to the fluid flowing therethrough. As a result, the differential temperature value is lowered and the slope of the thermal gradient curve is flattened. A low differential temperature value, as represented by a flattened thermal gradient curve, indicates fluid flow; conversely, a high differential temperature value, as represented by a relatively steep thermal gradient curve, indicates no fluid flow.

An additional aspect of the present invention is a monitoring system that incorporates at least one of the flow sensors and includes a display that indicates to the operator a selected valve position, i.e., open or closed, and the differential temperature value. Knowing these two factors, an operator can monitor the functional status of one or more drain valves. For instance, if the selected position indication is that the valve is open but the differential temperature value is high, indicating an absence of fluid flow, then the operator concludes that the valve is stuck in a closed position or is clogged. Conversely, if the display indicates a closed selected drain valve position and a low differential temperature value representing fluid flow, then the operator concludes that the valve is stuck in an open position. The operator can manually make this assessment by comparing the indicated differential temperature value to the predetermined trigger value to determine the state of fluid flow and then comparing the state of fluid flow to see if it is consistent with the selected position of the drain valve.

In a preferred embodiment of the invention the monitoring system includes a controller, which may be a computer, which receives signals representing the value of the differential temperature, the selected position of the drain valve, and the turbine operating status (hot or cold) and which provides suitable display indications for enabling operator controls, or which may directly initiate corrective actions. The controller includes a logic circuit which correlates these three parameters to a diagnosis of the drain valve and whether the valve and monitor are malfunctioning, in accordance with a pre-established logic table.

In another embodiment of the monitoring system, a second heater and third and fourth temperature sensing elements are connected to the fluid conduit on an opposite side of the drain valve from the first heater. The second heater and the third and fourth temperature sensing elements produce a second differential temperature value and add the capability of diagnosing monitoring system malfunction and other conditions of the valve without requiring determination of the turbine condition as being either hot or cold.

These and other features and advantages of the flow sensor and monitoring system of the invention will become more apparent with reference to the following detailed description and drawings.

DETAILED DESCRIPTION OF THE PREFERRED EMBODIMENTS

Figure 3:
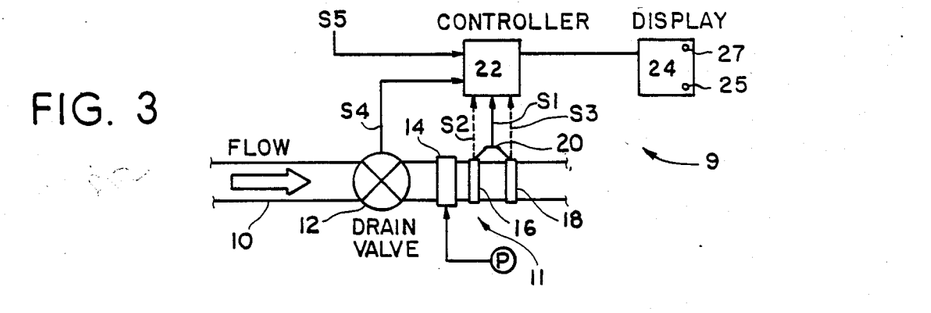
FIG. 3 is a schematic representation of a preferred monitoring system of the present invention using the preferred flow sensor.

Referring now to FIG. 3, a monitor system 9 is represented schematically, but with only one flow sensor 11 corresponding to one drain valve 12. It is understood that the monitor system 9 could include a plurality of drain valves variously disposed throughout the turbine casings, the turbine piping and the auxiliary piping. In FIG. 3, a fluid conduit or pipe 10 has a drain valve 12 operable therein to control fluid flow which normally drains in the left to right direction indicated by the arrow. A heater 14 is attached to an exterior surface of the pipe 10 by a strap-on connection in proximity to the drain valve 12. When electricity is supplied to the heater 14 from power source P, electrical heating elements in the heater 14 heat the pipe 10. Temperature sensing elements 16 and 18 are connected to the pipe 10 downstream of the heater at spaced intervals, with temperature sensing element 16 being in proximity to the heater 14. The temperature sensing elements 16 and 18 are preferably thermocouples which are known in the industry and commercially available. The thermocouples 16 and 18 are strapped onto the pipe 10 in the same way as the heater 14. Because the heater 14 and temperature sensing elements 16 and 18 are strapped onto the exterior surface of the pipe 10, the invention can be practiced without expensive modifications to existing pipe structure.

Temperature sensing elements 16 and 18 are electrically interconnected by line 20 in reverse series to produce a differential temperature signal S1 which represents the difference between the temperature of the pipe 10 sensed by temperature sensing element 16 and the temperature of the pipe 10 sensed by temperature sensing element 18. Signal S1 may be processed by controller 22 into a numeric value which can be displayed directly by the controller 22 having display 24. Alternatively, the controller 22 compares the actual differential temperature value signal to a stored predetermined differential temperature value and outputs a signal indicative of fluid flow based on whether the actual differential temperature value signal is above or below the predetermined differential temperature value. A flow condition status is displayed by the display 24 in response to the outputted signal. It is understood that the controller 22 and display 24 are located in a control room or area and the flow sensor 11 or sensors are located remotely from the control area.

Figure 4:
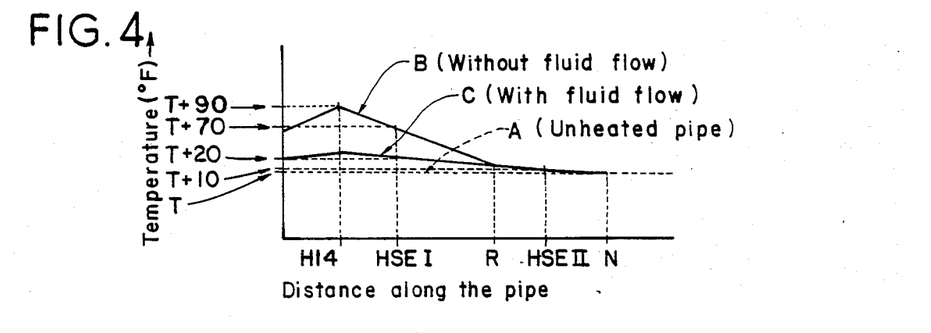
FIG. 4 is a graph showing hypothetical thermal gradient curves along the pipe shown in FIG. 3.

FIG. 4 is a graph of a thermal gradient curve produced by the heater 14 and how it is effected by fluid flow. Distance along pipe 10 is measured on the X-axis and temperature of the pipe 10 is measured on the Y-axis. Horizontal broken line A represents a temperature value T of the pipe 10 when no heat is supplied to the pipe 10 by heater 14. The absolute value of T would depend on the operating status of the turbine and the presence or absence of fluid flow through the pipe 10 and the temperature of the fluid. Heater 14 (H14), the first temperature sensing element 16 (HSE I) and the second temperature sensing element 18 (HSE II) are positioned along the X-axis to reflect relative distances between each and positions along the pipe 10. Actual distances and placement would be determined on a site specific basis. When no fluid is flowing and H14 is energized, a thermal gradient curve B is produced. Thermal gradient curve B is represented by a downwardly sloping line between H14 and a point N on the pipe 10, which indicates a point where the heat generated by heater H14 has a negligible effect on the normal temperature T of the pipe 10. The actual distance of point N depends on the thermal conductivity and dimensions of the pipe 10. The thermal gradient curve B is substantially linear from heater H14 up to a point R on the pipe 10 whereupon temperature begins to decrease less per unit of distance. The increase in temperature of the pipe 10 caused by heater H14 is determined on a site specific basis. In FIG. 4, the temperature of pipe 10 at H14 is given as T+90 degrees F to show that T is elevated by about 90 degrees F. HSE I is positioned on the pipe 10 in proximity to H14 so as to sense a temperature value T+70 which is elevated relative to the normal unheated temperature T of the pipe 10. HSE II is positioned on the pipe 10 at a point further away from H14 and senses a temperature value T+10, which is higher than T, but low relative to the temperature of the pipe 10 sensed by HSE I. It should be noted that both HSE I and HSE II are positioned on the thermal gradient curve B with HSE I being in proximity to H14.

From curve B, the differential temperature is (T+70)−(T+10)=60. When fluid flows through the drain valve, heat generated by H14 is conducted from the pipe 10 to the fluid and efficiently removed by the fluid flow, thereby creating a modified thermal gradient curve C having a flatter slope. The differential temperature value becomes (T+20)−(T+10) =10. The number 10 could be selected as the trigger value so that the controller 22 outputs a signal to display 24 which illuminates light 25 to indicate fluid flow when differential temperature value is at or below 10. The trigger value is a value which provides a cut-off between an indication of fluid flow and an indication of no fluid flow. From FIG. 4, the thermal gradient curves illustrate that upper and lower limits of the trigger value are established by differential temperatures calculated at each curve B and C. With the lower limit (fluid flow) defined as 10 and the upper limit (no flow) defined as 60, an operator can choose an appropriate trigger value between 10 and 60, preferably slightly above the lower limit. For instance, in FIG. 4 the trigger value could be chosen to be 15, so that an actual differential temperature of greater than 15 would be interpreted as a no flow condition. The value of T may vary as fluid of different temperatures flows through pipe 10. The heater 14 is designed to always add a certain quantity to T for the purpose of deriving differential temperature values.

In the monitoring system 9 of the present invention, the trigger value is a reference value for designating a differential temperature value as high or low relative to the reference value. With 15 chosen as the hypothetical trigger value, controller 22 would identify an inputted actual differential temperature value signal S1 as high or low relative to 15. A "high" identification would indicate no fluid flow and a "low" identification would indicate fluid flow.

The controller 22 shown in FIG. 3 is capable of performing a diagnostic function. It may also compute the differential temperature value signal by receiving individual temperature signals S2 and S3 (shown in broken lines) from the heat sensing elements 16 and 18 and subtracting S3 from S2; in that case, temperature sensing elements 16 and 18 could be thermometers.

Signal S4 indicating a selected drain valve position is inputted to the controller 22 and can be produced by any known means, such as a position switch. The controller 22 also receives the differential temperature value signal S1 (or S3-S2) and a signal S5 indicative of steam turbine operating condition, i.e., hot or cold. Signal S5 can be produced by a heat sensor (not shown) connected to the turbine casing, or by a pressure sensor connected to the turbine casing. The controller 22 applies signals S1, S4 and S5 to a logic circuit in order to output to the display 24 a diagnosis of the operating condition of the drain valve. The display 24 may include indicators 25 and 27 which could be digital readouts or display lamps.

Figure 5:
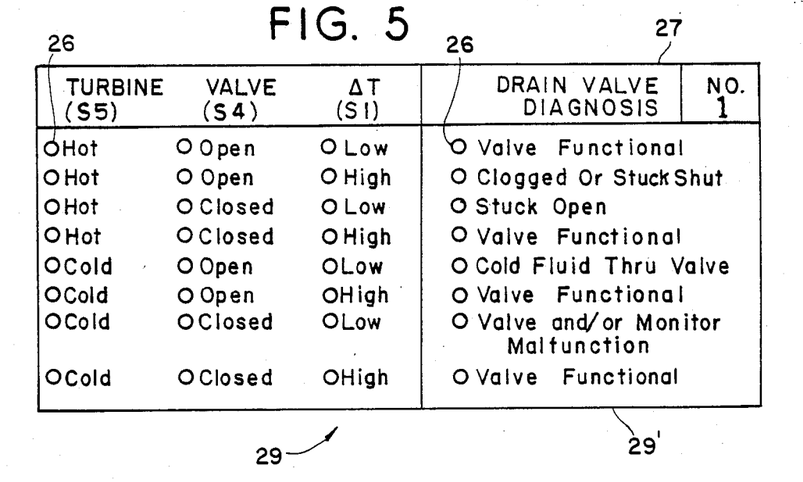
FIG. 5 is a logic table for the embodiment of the invention shown in FIG. 3.

The logic circuit of the controller 22 correlates the three input signals to a drain valve diagnosis according to the logic table 29 of FIG. 5. From the table, if the turbine is hot and the selected drain valve position is indicated as open, and the differential temperature value ($\Delta T$) is low, the drain valve is diagnosed as being functional. The logic table 29 may be represented as a display 29' having a plurality of indicator lights 26' arranged such that a valve diagnosis light 26' is illuminated when a row of condition (S5, S4, S1) associated with each diagnosis is positively indicated. In view of the fact that the monitoring system will monitor several drain valves throughout a plant, the display 29' includes an indicator 27 to indicate the number and/or location of a particular drain valve that is being diagnosed. In the case of plural drain valve sensors, the controller 22 would include means for receiving the inputs of multiple flow sensors and means for outputting to the display 24 or 29' the diagnosis of a particular drain valve. The controller 22 may include a command input that allows the operator to select a particular drain valve for diagnosis, or the controller 22 could run an automatic sequential test cycle in which the drain valves are constantly diagnosed sequentially and periodically. The display 29' may display the differential as a numeric value in addition to displaying a diagnosis. Displaying the differential value allows the operator to visually monitor the differential and observe changes thereto. The logic table 29 may also be represented as a display 29' which displays conditions S5, S4 and S1 in rows with corresponding indicator lights 26 such that if three indicator lights in a row are illuminated, an operator would deduct a corresponding diagnosis.

The display 29' may alternatively comprise a plurality of identical displays, each being directed to a particular drain valve. In that case, the controller 22 would have multiple flow sensor inputs and multiple signal outputs. In the case of multiple drain valves, each site is likely to produce a different trigger value for its associated, high and low differential values. Therefore, each heater of each flow sensor could have an adjustable heat output, the heat output being preset for each flow sensor such that all flow sensors have a similar differential temperature value range so that a single trigger value can be used. This is advantageous when the display 24 or 24' displays the differential as a numeric value so that an operator can be trained to recognize the single trigger value for multiple sensors and respond accordingly.

Figure 6:
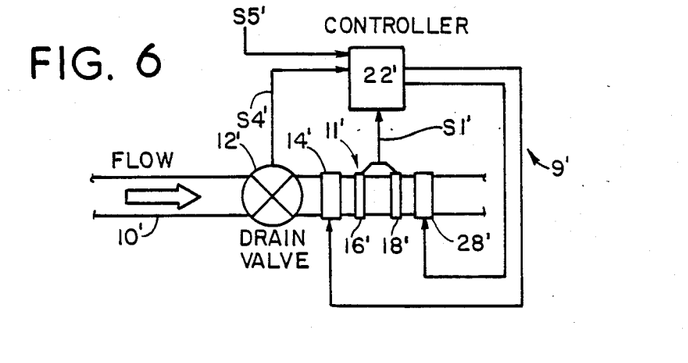
FIG. 6 is a schematic representation of a modified version of the embodiment illustrated in FIG. 3.

A variation of the invention is illustrated in FIG. 6 as a system 9' including a flow sensor 11' having two temperature sensing elements 16' and 18' attached to pipe 10', respectively downstream of heater 14' and upstream of heater 28'. Controller 22' receives input signal S4' indicative of a selected valve position of valve 12', signal S5' indicative of the turbine operating condition, i.e., hot or cold, and signal S1' indicative of the differential temperature value. Controller 22', illustrated schematically in FIG. 10, includes a heater controller 30 and a temperature sensing element controller 32. The heater controller 30 and the temperature sensing element controller 32 are interconnected through bi-directional buses I (HC) and I (TCC) to a system control unit 34. Unit 34 is further connected to a central display and operator control panel 36 over a bi-directional bus 38. Heater controller 30, under control from the system control unit 34 provides for calibration, on-line testing (e.g., continuity checking and shorts to ground), processing of alarm indications, and toggling of heaters 14' and 28'. Similarly, under control of the system control unit 34, the temperature sensing element controller 32 performs corresponding functions for temperature sensing elements 16' and 18', e.g., on-line testing for failure of one or both of the temperature sensing elements.

Figure 10:
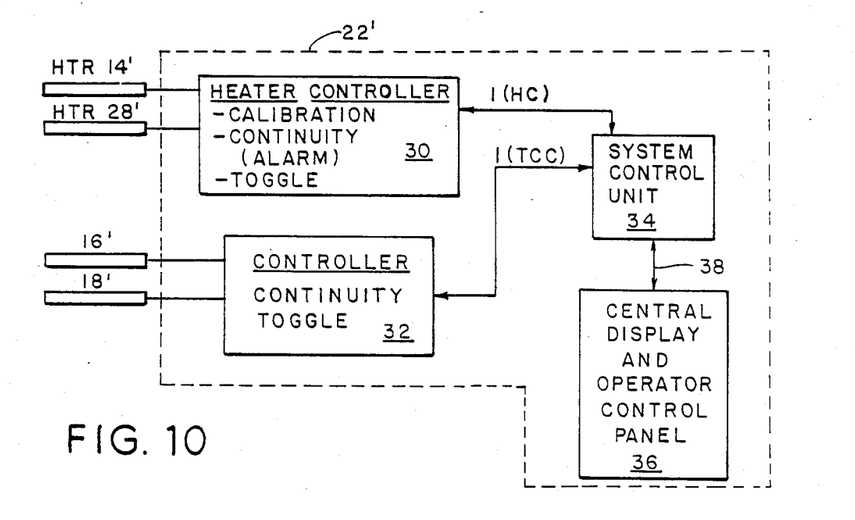
FIG. 10 is a schematic block diagram of the monitor system of the embodiment shown in FIG. 6.
Figure 11:
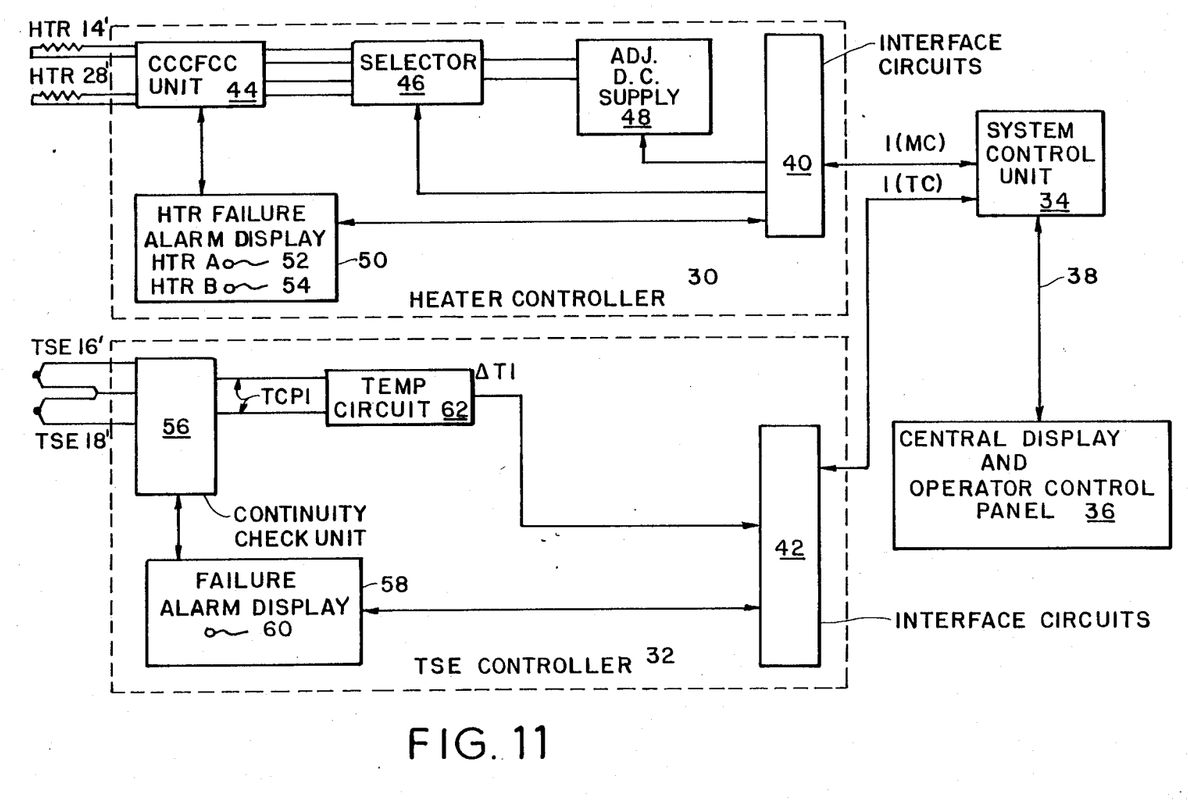
FIG. 11 is a schematic, partially in block diagram form, of the monitor system of FIG. 6.

FIG. 11 is a schematic illustration, partially in block form, of details of the components of the monitoring system of the invention depicted in FIG. 10 including a heater controller 30 and a temperature sensing element (TSE) controller 32. As shown, interface circuits 40 and 42 in the controllers 30 and 32, respectively, interface between the internal components of the latter and the system control unit 34. Heaters 14' and 28' are independently connected through a continuity check, current flow check and a calibration (CCCFCC) unit 44 and through a switch, or toggle, selection circuit (SELECTOR) 46, to an adjustable power supply 48. Display unit 50 includes alarm lamps 52 and 54, respectively corresponding to the heaters 14' and 28' and which are respectively and independently illuminated when the corresponding heater has failed, by corresponding outputs from the unit 44. The associated units 44 and 50, unit 46 and the adjustable DC supply unit 48 are connected through interface circuits 40 and appropriate buses, as shown, to a system control unit 34.

System control unit 34 automatically adjusts the output of the DC supply unit 48 and further in accordance with the selection of heater 14' or 28', as affected by operation of selector 46 by the system control unit 34, to assure that identical heat outputs are produced by heaters 14' and 28'. Unit 34 also produces a heater failure display on central display panel 36.

The temperature sensing elements (TSE) 16' and 18' are connected as a pair in series, in a bucking, or opposed, relationship. Continuity check unit 56 checks the continuity of the pair on an on-going basis and, should lack of continuity indicating an element failure be detected, provides an output to failure alarm unit 58 for lighting the corresponding alarm lamp 60 corresponding to a failed temperature sensing element. The output is also provided to system control unit 34 for producing a failure display on central display panel 36 of the controller 22'. A temperature circuit 62 supplies an output differential temperature value signal ($\Delta T1$) to interface circuit 42. The temperature circuit 62 produces an output voltage signal proportional to the temperature differential sensed by the pair of temperature sensing elements 16' and 18'. Interface circuits 42 interconnect the units 56, and 62 with the system control unit 34 through appropriate buses, as indicated. Unit 34 also produces a selectable differential temperature display on the central display unit 36 during normal monitoring, and an automatic and verified indication of an alarm condition on the control display panel 36. The value and sign of the temperature differential may be displayed digitally in degrees fahrenheit as currently measured by the temperature sensing elements.

The system is operable in an automatic test mode or in a selective test mode. The operator tests a selected one of the plural components of the system by making a selection of the test mode. Assuming that selector 46 normally selects heater 14', under normal operating conditions heater 14' will heat the pipe 10'. Under normal operating conditions, temperature sensing element 16' will sense a higher temperature, relative to that sensed by temperature sensing element 18' and, for an assumed polarity or sense in which the respective outputs are paired, an output of a positive differential temperature value is produced. Conversely, if complimentary heater 28' were selected and energized and thus substituted for heater 14', under this same analysis, the output would be a negative differential temperature value, i.e., the same numerical or absolute temperature differential value but of opposite sign. As will be appreciated and as noted above, the calibration circuit of unit 44, under direction of system control unit 34 and through adjustment thereby of the adjustable DC supply 48, provides for controlling the respective power levels supplied to heater 14' and to heater 28' to assure that the same heater power is developed in both, resulting in the same absolute values of differential temperature being provided.

The system has the ability to toggle or switch between heater 14' and heater 28' in order to substitute heaters upon failure of one or the other. This results in continuous monitoring and prevents false alarm that would otherwise result from heater failure. For example, if heater 14' fails, unit 34 will operate through a selector 46 to switch to heater 28'.

Physical replacement (i.e., as distinguished from automatic substitution) of the heaters and of heat sensing elements is made on-line following specific identification of the failed element at the controller.

Should both heaters and/or one of the sensing elements fail, the sensor channel is disabled so as to prevent a false alarm. Further, an in-phase blinking of a lamp and the alarm lamp for the failed channel informs the user that this channel has failed and has been disabled.

Automatic toggling is performed for verification of a sensed alarm condition. Specifically, should the normal differential temperature values change significantly, the alarm condition is automatically verifiable by toggling two heaters and comparing the corresponding differential temperature value. If not of the same numerical value (but of opposite sign), the conclusion may be reached that the change in differential temperature is a false alarm. On the other hand, the failure of a heat sensing element to pass the verification test, as thus conducted, serves to alert the operator to the need of system maintenance.

A more detailed description of a number of system checks capable of being performed with the circuity shown in FIG. 10 and 11 is described in my copending application Ser. No. 058,956, filed June 5, 1987, which is incorporated herein by reference. When using a second heater as in the embodiment shown in FIG. 6, the sensor unit becomes electronically equivalent to the heated split thermowell for a water induction monitor as described in the above-identified patent application. The same tests that verify the operation of the heated split thermowell can be performed on the drain flow sensor unit shown in FIG. 6 to monitor operation of the sensor.

Figure 7:
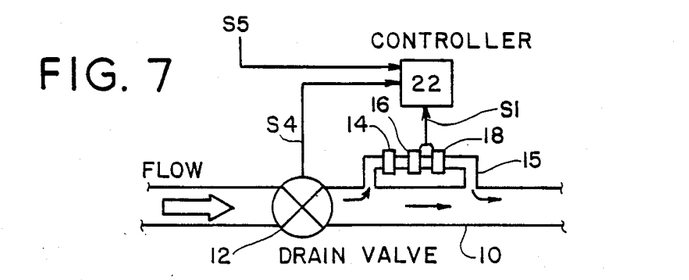
FIG. 7 is a schematic representation of another embodiment of the invention.

FIG. 7 shows an alternative arrangement of the embodiment of FIG. 3 in which the flow sensor 11 including heater 14 and temperature sensing elements 16 and 18 are connected to an auxiliary pipe 15 rather than the pipe 10. The auxiliary pipe 15 has a reduced diameter in order to reduce the heating requirements of heater 14 and size requirements of temperature sensing elements 16 and 18.

Figure 8:
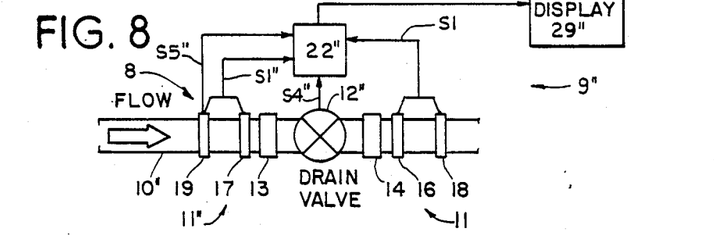
FIG. 8 is a schematic representation of another embodiment of the invention.

Another monitoring system 9" embodiment of the invention is illustrated in FIG. 8 in which the flow sensor unit 11 of the FIG. 3 embodiment is used with a second flow sensor unit 11" on the opposite, upstream side of drain valve 12". The second flow sensor unit 11" includes a heater 13 attached to the drain pipe 10" upstream of the drain valve 12" and two temperature sensing elements 17 and 19 attached to the pipe 10" at successive positions upstream of the heater 13. The controller 22" receives input signal S4" indicative of a selected valve position, signal S5" indicative of the turbine operating condition, i.e., hot or cold, and signals S1 and S1" indicative of the differential temperature values for each sensor unit 11 and 11", respectively. The signal S5" is produced by temperature sensing element 19 as a temperature signal indicative of the temperature of pipe 10" at the temperature sensing element 19. In other words, temperature sensing elements 17 and 19 are interconnected in reverse series to produce a differential temperature S1" which is inputted to controller 22", while at the same time temperature sensing element 19 supplies a separate signal S5" which is indicative of the temperature sensed by the temperature sensing element 19. Turbine operating condition, i.e., hot or cold, is determined by the value of the temperature sensed by temperature sensing element 19.

Figure 9:
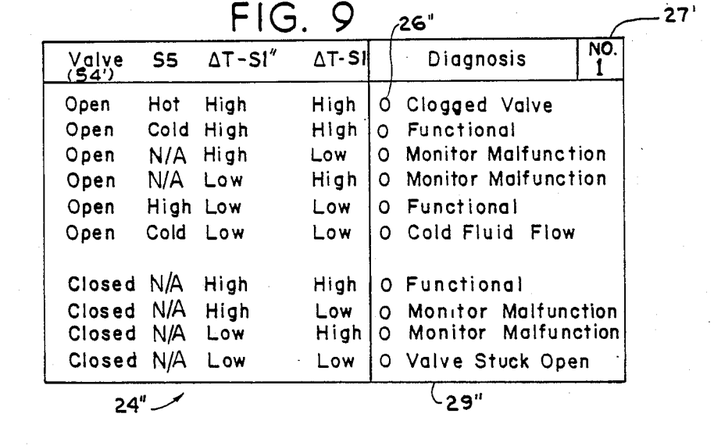
FIG. 9 is a logic table used in the FIG. 8 embodiment.

The controller 22" applies the inputted signals S1, S1", S4", and S5" to a logic circuit which is represented by the logic table 24" of FIG. 9 in order to output a diagnosis of drain valve and/or monitor condition. The table 24" of FIG. 9 also points out that by using two differential temperature values, monitor malfunction can be determined without the need for a sensed condition of the turbine indicated by signal S5". In the table, N/A stands for "not applicable" since the diagnosis can be made without determination of the hot or cold status of the turbine.

By virtue of the logic circuit, the controller 22" outputs to a display 29" a drain valve or monitor diagnosis. The display 29" may be provided with indicator lights 26" to indicate a diagnosis according to the logic table 24" of FIG. 9. A diagnosis representing a combination of sensed conditions has an associated indicator light which is illuminated to reflect the system or valve diagnosis. When all of the system conditions of a row are present, a corresponding diagnosis associated with the row will be illuminated.

Since the monitoring system of the FIG. 8 embodiment would likely include plural flow sensors, each flow sensor comprising a pair of sensor units 11 and 11"', the display 29" may also include an indicator light 27' which indicates which flow sensor within the system is being diagnosed at a particular time.

Numerous modifications and adaptations of the sensor units and the instrumentation system of the present invention will be apparent to those so skilled in the art and thus it is intended by the following claims to cover all such modifications and adaptations which fall within the true spirit and scope of the invention.

What is claimed is:

1. A monitoring system for monitoring at least one drain valve disposed in a fluid conduit having a temperature affected by the presence of fluid flow, and producing a diagnosis of the condition of each drain valve as functional, clogged or stuck shut, stuck open, or cold fluid flow through the drain valve, comprising:

at least one flow sensor, each flow sensor including a heater attached to an exterior surface of the fluid conduit downstream of the drain valve, the heater, when energized, producing a thermal gradient along the fluid conduit which varies as a function of fluid flow, a first temperature sensing element attached to the exterior surface of the fluid conduit at a position spaced downstream of the heater and producing an output indicative of the temperature of the fluid conduit at the position of the first temperature sensing element, a second temperature sensing element attached to the exterior surface of the fluid conduit at a position spaced downstream of the first temperature sensing element, and producing an output indicative of the temperature of the fluid conduit at the position of the second temperature sensing element, and means responsive to the outputs of the first and second temperature sensing elements for producing a differential temperature output signal based on a difference between the temperature sensed at the first temperature sensing element and the temperature sensed at the second temperature sensing element, the differential temperature output signal having relatively greater and lesser values responsive to and thereby indicative of the presence and absence of fluid flow, drain valve position indicator means for producing and outputting a signal indicative of a selected position for each corresponding drain valve, operating condition indicator means for producing and outputting a signal indicative of an operating condition of the steam turbine, and control means responsive to the output signals of the operating condition indicator means, the differential temperature producing means, and the drain valve position indicator means, for outputting a signal indicative of a diagnosis of the drain valve, and display means, responsive to the output signal of the control means, for displaying the diagnosis of the drain valve.

2. A monitoring system as recited in claim 1, wherein the first and second temperature sensing elements are first and second thermocouples, each producing an electrical output indicative of temperature.

3. A monitoring system as recited in claim 2, wherein the means for producing a differential temperature output comprises:

means for connecting the first and second thermocouples, in an opposing series relationship, whereby the electrical output of one thermocouple is subtracted from the electrical output of the other thermocouple.

4. A monitoring system as recited in claim 3, wherein the output signal of the drain valve position indicator means is indicative of a condition of the drain valve as selected open or closed, the output signal of the operating condition indicator means is indicative of a condition of the steam turbine as operating hot or cold and the output signal of the differential temperature producing means is indicative of a condition of fluid flow based on whether the differential temperature value is high or low relative to a predetermined trigger value stored in the control means, and wherein the control means includes:

logic circuit means for correlating the conditions of the drain valve, the steam turbine and fluid flow to a drain valve diagnosis.

5. A monitoring system for monitoring at least one drain valve disposed in a fluid conduit having a temperature affected by the presence of fluid flow, and producing a diagnosis of the condition of each drain valve as functional, clogged or stuck shut stuck open or cold fluid flow through the drain valve, comprising:

at least one flow sensor, each flow sensor including a first heater attached to an exterior surface of the fluid conduit downstream of the drain valve, the heater, when energized, producing a thermal gradient along the conduit which varies as a function of fluid flow, a first temperature sensing element attached to the exterior surface of the fluid at a position spaced downstream of the heater and producing an output indicative of the temperature of the fluid conduit at the position of the first temperature sensing element, a second temperature sensing element attached to the exterior surface of the fluid conduit at a position spaced downstream of the first temperature sensing element, and producing an output indicative of the temperature of the fluid conduit at the position of the second temperature sensing element, means responsive to the outputs of the first and second temperature sensing elements, for producing a differential temperature output signal based on a difference between the temperature sensed at the first temperature sensing element and the temperature sensed at the second temperature sensing element, the differential temperature output signal having relatively greater and lesser values responsive to and thereby indicative of the presence and absence of fluid flow, and a second heater attached to the exterior surface of the fluid conduit downstream of the second temperature sensing element, the second heater, when energized, producing a thermal gradient along the conduit which varies as a function of fluid flow, drain valve position indicator means for producing and outputting a signal indicative of a selected position for each corresponding drain valve, operating condition indicator means for producing and outputting a signal indicative of an operating condition of the steam turbine, and control means responsive to the output signals of the operating condition indicator means, the differential temperature producing means, and the drain valve position indicator means for outputting a signal indicative of a diagnosis of each drain valve, and display means, for displaying the diagnosis of each drain valve.

6. A monitoring system according to claim 5, wherein:

the first and second temperature sensing elements are first and second thermocouples, each producing an electrical output indicative of temperature.

7. A monitoring system according to claim 6, wherein the means for producing a differential temperature output comprises means for connecting the first and second thermocouples, in an opposing series relationship, whereby the electrical output of one thermocouple is subtracted from the electrical output of the other thermocouple.

8. A monitoring system according to claim 7, wherein the output signal of the drain valve position indicator means is indicative of a condition of the drain valve as selected open or closed, the output signal of the operating condition indicator means is indicative of a condition of the steam turbine as operating hot or cold and the output signal of the differential temperature producing means is indicative of a condition of fluid flow based on whether the differential temperature value is high or low relative to a predetermined trigger value stored in the control means, and wherein the control means includes:
  logic circuit means for correlating the conditions of the drain valve, the steam turbine and fluid flow to a drain valve diagnosis.

9. A monitoring system as recited in claim 8, wherein:
  the control means includes heater control means for determining failure of one heater and switching to the other heater.

10. A monitoring system as recited in claim 9, wherein the heater control means selectively supplies power to the first and second heaters.

11. A monitoring system as recited in claim 10, wherein the heater control means includes means for determining operability of each heater and producing an inoperative heater output upon determining the inoperability of a heater.

12. A monitoring system as recited in claim 11, further comprising:
  temperature sensing element control means including means for monitoring sensed temperature outputs of the first and second temperature sensing elements, means for providing a differential temperature output indicative of the difference between the sensed temperature outputs of the first and second temperature sensing elements, and means for determining the operability of the first and second temperature sensing elements, wherein the control means includes means for controlling said heater and temperature sensing element control means to select the first heater in a normal monitoring mode of the monitor system, means for defining a normal differential temperature output condition, means for detecting an alarm condition in the normal monitoring mode when the differential temperature differs from the normal differential temperature condition, and means for producing an alarm output condition, and means for producing an alarm output in response to detecting an alarm condition,
  said control means being responsive to an inoperative heater output from said heater control means for automatically causing said heater control means to select the second heater and supply electrical power thereto.

13. A monitoring system as recited in claim 12, wherein:
  said control means, in an automatic test mode, includes means for performing on-line testing of the first and second temperature sensing elements.

14. A monitoring system as recited in claim 13, wherein:
  said control means for performing the automatic mode of on-line testing of each of the temperature sensing elements, determines and stores the differential temperature in a normal operating mode, causes said heater control means to switch to the second heater and supply electrical power thereto for a sufficient time period to establish thermal stability of the first and second temperature sensing elements, determines the differential temperature and compares same with the differential temperature using the first heater, and detects a sensor failure condition when the respective differential temperatures using the first and second heaters, under test, do not have the same numerical value and opposite sign.

15. A monitoring system for monitoring at least one drain valve disposed in a fluid conduit having a temperature affected by the presence of fluid flow, and producing a diagnosis of the condition of each drain valve as functional, clogged or stuck shut, stuck open, or cold fluid flow through the drain valves, comprising:
  at least one pair of flow sensors, one of the pair including a heater attached to an exterior surface of the fluid conduit downstream of the drain valve, the heater, when energized, producing a thermal gradient along the conduit which varies as a function of fluid flow, a first temperature sensing element attached to the exterior surface of the fluid conduit at a position spaced downstream of the heater and producing an output indicative of the temperature of the fluid conduit at the position of the first temperature sensing element, a second temperature sensing element attached to the exterior surface of the fluid conduit at a position spaced downstream of the first temperature sensing element, and producing an output indicative of the temperature of the fluid conduit at the position of the second temperature sensing element, and means responsive to the outputs of the first and second temperature sensing elements for producing a differential temperature output signal based on a difference between the temperature sensed at the first temperature sensing element and the temperature sensed at the second temperature sensing element, the differential temperature output signal having relatively greater and lesser values responsive to and thereby indicative of the presence and absence of fluid flow,
  the other of the pair of flow sensors including a second heater attached to an exterior surface of the fluid conduit at a position spaced upstream of the drain valve, the heater, when energized, producing a thermal gradient along the conduit which varies as a function of fluid flow, a third temperature sensing element attached to the exterior surface of the fluid conduit at a position spaced upstream of the second heater, and a fourth temperature sensing element attached to the exterior surface of the fluid conduit at a position spaced upstream of the third temperature sensing element, and second means responsive to the outputs of the third and fourth temperature sensing elements for producing a second differential temperature output signal based on a difference between temperature sensed at the third and fourth temperature sensing elements, the second differential temperature output signal having relatively greater and lesser values responsive to and thereby indicative of the presence and absence of fluid flow,
  drain valve position indicator means for producing and outputting a signal indicative of a selected position for each corresponding drain valve,
  control means responsive to the first and second differential temperature signals and drain valve position signal for outputting a signal indicative of a diagnosis of the drain valve, and
  display means responsive to the output signal of the control means, for displaying the diagnosis of the drain valve.

16. A monitoring system as recited in claim 15, wherein:
  the control means includes logic circuit means, responsive to the first and second differential temperature value signals and the selected drain valve position signal for outputting a signal indicative of a diagnostic condition.

17. A monitoring system as recited in claim 15, further comprising:
operating condition indicator means for producing and outputting a signal indicative of an operating condition of the steam turbine, and wherein the control means is responsive to the first and second differential temperature value signals, the drain valve position signal and the operating condition signal.

* * * * *